(12) United States Patent
Yokoyama

(10) Patent No.: US 12,086,124 B2
(45) Date of Patent: Sep. 10, 2024

(54) INTEGRATION DEVICE, DATA TABLE INTEGRATION METHOD, AND PROGRAM

(71) Applicant: NEC Corporation, Tokyo (JP)

(72) Inventor: Harumichi Yokoyama, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 17/924,139

(22) PCT Filed: May 13, 2020

(86) PCT No.: PCT/JP2020/019121
§ 371 (c)(1),
(2) Date: Nov. 9, 2022

(87) PCT Pub. No.: WO2021/229724
PCT Pub. Date: Nov. 18, 2021

(65) Prior Publication Data
US 2023/0195711 A1  Jun. 22, 2023

(51) Int. Cl.
*G06F 16/22* (2019.01)
*G06F 7/08* (2006.01)

(52) U.S. Cl.
CPC .......... *G06F 16/2282* (2019.01); *G06F 7/08* (2013.01)

(58) Field of Classification Search
None
See application file for complete search history.

(56) References Cited

U.S. PATENT DOCUMENTS

| | | | |
|---|---|---|---|
| 5,664,172 A | 9/1997 | Antoshenkov | |
| 2017/0154052 A1* | 6/2017 | Hassanzadeh | G06F 16/215 |
| 2018/0357669 A1* | 12/2018 | Tokuhisa | G06Q 30/02 |
| 2019/0138590 A1* | 5/2019 | Shirolkar | G06F 16/2228 |
| 2019/0266142 A1* | 8/2019 | Furusho | G06F 16/2282 |
| 2021/0081424 A1* | 3/2021 | Verma | G06F 16/24568 |

(Continued)

FOREIGN PATENT DOCUMENTS

| | | |
|---|---|---|
| JP | H03-288967 A | 12/1991 |
| JP | H09-325888 A | 12/1997 |

OTHER PUBLICATIONS

International Search Report for PCT Application No. PCT/JP2020/019121, mailed on Aug. 18, 2020.

(Continued)

*Primary Examiner* — Irene Baker
(74) *Attorney, Agent, or Firm* — Sughrue Mion, PLLC

(57) ABSTRACT

An integration device is configured to integrate two data tables each having at least one row of data elements having comparability in magnitude as a first data table and a second data table. Uniqueness is determined with respect to each of data elements of the first data table. Upon finding uniqueness, the integration device determines the lower-limit position, at which a row of the second data table can be added to the lowermost row of the first data table after ascending sorting, in conformity with an ascending order of sorting. The integration device determines integration-target rows when the data element of the row of the second data table matches the data element of the next row to the lower-limit position of the first data table after ascending sorting, thus generating an integrative data table to integrate integration-target rows with the first data table and the second data table.

6 Claims, 7 Drawing Sheets

(56) References Cited

U.S. PATENT DOCUMENTS

2021/0117828 A1\* 4/2021 Takamatsu .......... G06F 16/2282
2021/0149896 A1\* 5/2021 Yu ........................... G06F 18/22
2021/0382882 A1\* 12/2021 Mogre ................... H04L 67/10

OTHER PUBLICATIONS

A. Matono et al., "Bound Merge Join: A Skippable Join Algorithm between an Extended B+trees", DEIM Forum 2010, E8-4.
Hitachi, Ltd., "HiRDB Version 6 Command Reference", Dec. 1997. p. 537.
JP Office Action for JP Application No. 2022-522413, mailed on Jan. 9, 2024 with English Translation.

\* cited by examiner

FIG. 8

| LEFT TABLE (SECOND DATA TABLE) ||
|---|---|
| ROW ID | KEY |
| L0 | 3 |
| L1 | 5 |
| L2 | 3 |
| L3 | 1 |

| RIGHT TABLE (FIRST DATA TABLE) ||
|---|---|
| ROW ID | KEY |
| R0 | 2 |
| R1 | 1 |
| R2 | 3 |
| R3 | 1 |

INTEGRATION DEVICE, DATA TABLE INTEGRATION METHOD, AND PROGRAM

This application is a National Stage Entry of PCT/JP2020/019121 filed on May 13, 2020, the contents of all of which are incorporated herein by reference, in their entirety.

TECHNICAL FIELD

The present invention relates to an integration device, a data table integration method, and a program.

BACKGROUND ART

The existing technology is provided to generate a new data table by integrating two data tables each of which includes at least data elements having comparability in magnitude as one row of information.

The related technology is disclosed in Patent Document 1. Patent Document 1 disclose the technology to generate a new output table according to an outer-join process.

CITATION LIST

Patent Literature Document

Patent Document 1: Japanese Patent Application Publication No. H03-288967

SUMMARY OF INVENTION

Technical Problem

It is desired to develop a technology to reduce the amount of processing in generating integrative data tables described above.

For this reason, the present invention aims to provide an integration device, a data table integration method, and a program, which can solve the aforementioned objective problem.

Solution to Problem

In a first aspect of the present invention, an integration device includes a uniqueness determination means configured to determine uniqueness with respect to data elements of a first data table within two data tables each having at least one row of information including data elements having comparability in magnitude, a position determination means, which when the first data table includes the data elements each having uniqueness, is configured to compare data elements of rows of a second data table within two data tables with the data elements of rows of the first data table after ascending sorting using data elements of rows of the first data table in magnitude, thus determining a lower-limit position, at which each row of the second data table is to be added to the lowermost row of the first data table after ascending sorting, entirely in conformity with an ascending order of sorting, and an integration means, which when a data element of a row of the second data table matches a data element of the next row to the lower-limit position of the first data table after ascending sorting, which is identified using the data element of the row, is configured to determine integration-target rows indicating data elements in the second data table and the first data table, thus generating an integrative data table for integrating at least the integration-target rows with the second data table and the first data table.

In a second aspect of the present invention, a data table integration method is implemented by determining uniqueness with respect to data elements of a first data table within two data tables each having at least one row of information including data elements having comparability in magnitude, when the first data table includes an array of data elements each having uniqueness, comparing data elements of rows of a second data table within two data tables with data elements of rows of the first data table after ascending sorting using data elements of rows of the first data table in magnitude, thus determining a lower-limit position, at which each row of the second data table is to be added to the lowermost row in the array of the first data table after ascending sorting, entirely in conformity with an ascending order of sorting, determining an integration-target row, at which a data element of a row of the second data table matches a data element of a row in an array of the first data table having the lower-limit position to be identified using the data element of the row after ascending sorting, in either the second data table or the first data table, and generating an integrative data table for integrating the first data table and the second data table by way of at least the integration-target row.

In a third aspect of the present invention, a program causes a computer of an integration device to implement a uniqueness determination means configured to determine uniqueness with respect to data elements of a first data table within two data tables each having at least one row of information including data elements having comparability in magnitude, a position determination means, which when the first data table includes an array of data elements each having uniqueness, is configured to compare data elements of rows of a second data table within two data tables with data elements of rows of the first data table after ascending sorting using data elements of rows of the first data table in magnitude, thus determining a lower-limit position, at which each row of the second data table is to be added to the lowermost row in the array of the first data table after ascending sorting, entirely in conformity with an ascending order of sorting, and an integration means configured to determine an integration-target row, at which a data element of a row of the second data table matches a data element of a row in an array of the first data table having the lower-limit position to be identified using the data element of the row after ascending sorting, in either the second data table or the first data table, thus generating an integrative data table for integrating the first data table and the second data table by way of at least the integration-target row.

Advantageous Effects of Invention

According to the present invention, it is possible to reduce the amount of processing in generating integrative data tables.

BRIEF DESCRIPTION OF DRAWINGS

FIG. 8 is a second drawing showing an example of two data tables subjected to integration according to the exemplary embodiment.

DESCRIPTION OF EXEMPLARY EMBODIMENTS

Hereinafter, an integration device according to the exemplary embodiment of the present invention will be described with reference to the drawings.

Figure 1:
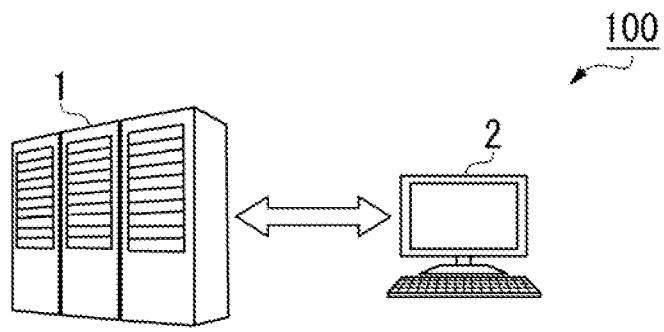
FIG. 1 is a schematic diagram showing the configuration of an information processing system including an integration device according to the exemplary embodiment.

FIG. 1 shows the configuration of an information processing system including the integration device of the exemplary embodiment.

As shown in FIG. 1, an information processing system 100 can be configured of an integration device 1 and a terminal 2 which are connected together through a communication network. The integration device 1 is configured to generate an integrative data table serving as a single data table which is produced by integrating at least two data tables stored therein. A user may use the terminal 2 to operate the integration device 1. In this connection, the integration device 1 and the terminal 2 are each configured of a computer.

Figure 2:
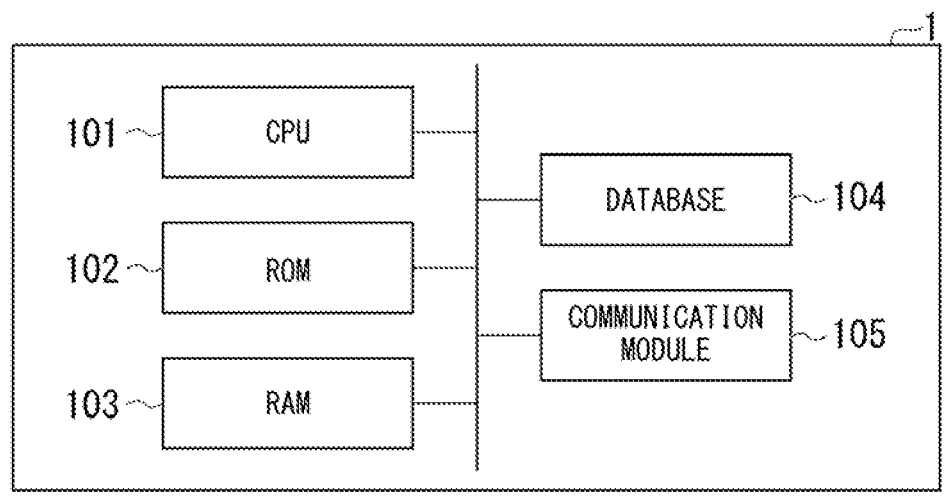
FIG. 2 is a block diagram showing a hardware configuration of the integration device according to the exemplary embodiment.

FIG. 2 is a block diagram showing the hardware configuration of the integration device 1.

As shown in FIG. 2, the integration device 1 is a computer including various hardware elements such as a CPU (Central Processing Unit) 101, a ROM (Read-Only Memory) 102, a RAM (Random-Access Memory) 103, a database 104, and a communication module 105. Incidentally, the terminal 2 is a computer having similar hardware elements.

Figure 3:
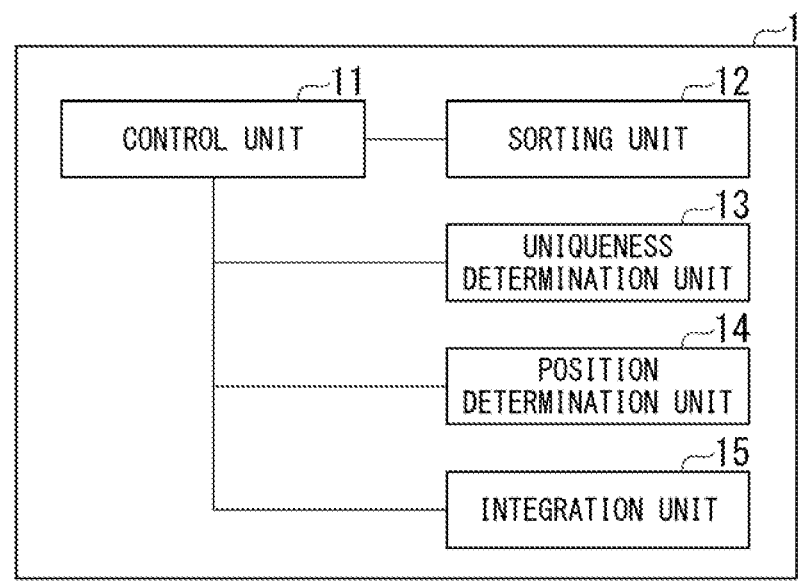
FIG. 3 is a functional block diagram of the integration device according to the exemplary embodiment.

FIG. 3 is a functional block diagram of the integration device 1.

The integration device 1 is configured to execute programs to generate integrative data tables. Accordingly, the integration device 1 can exercise various functions as a control unit 11, a sorting unit 12, a uniqueness determination unit 13, a position determination unit 14, and an integration unit 15.

The control unit 11 is configured to control various functional parts of the integration device 1.

The sorting unit 12 is configured to sort rows in data tables, each of which includes at least data elements having comparability in magnitude as one row of information, according to data elements in rows.

The uniqueness determination unit 13 is configured to determine uniqueness with respect to each of data elements in a first data table among two data tables each of which includes at least data elements having comparability in magnitude as one row of information.

Upon determining uniqueness with respect to each of data elements in the first data table, the position determination unit 14 is configured to compare data elements of rows in the second data table with data elements of rows in the first data table subjected to ascending sorting using data elements of rows of the first data table in magnitude. Upon comparison in magnitude, the position determination unit 14 is configured to determine the lower-limit position of the first data table, at which a certain row of the second data table can be added to the lowermost row of the first data table after ascending sorting, entirely in conformity with the ascending order of sorting.

When data elements of rows in the second data table match data elements of the next row to the lower-limit position of the first data table after ascending sorting using data elements of rows, the integration unit 15 is configured to determine integration-target rows indicating the data elements in the first data table and the second data table. Accordingly, the integration unit 15 is configured to generate an integrative data table integrating at least the integration-target rows in the second data table and the first data table.

Figure 4:
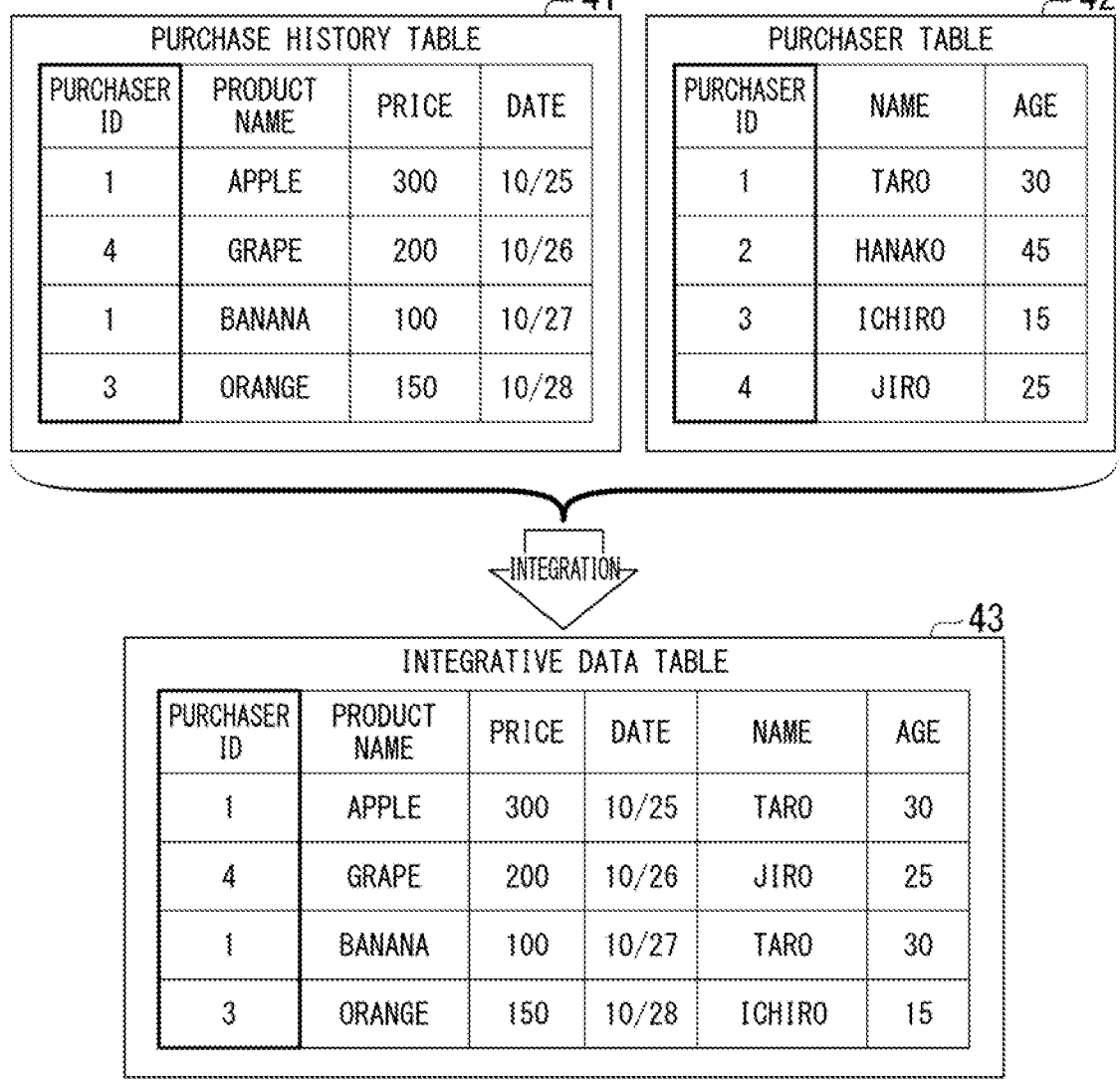
FIG. 4 is a drawing showing an example of generating an integrative data table according to the exemplary embodiment.

FIG. 4 is a drawing showing an example of generating an integrative data table.

As an example of generating an integrative data table, FIG. 4 shows an example of generating an integrative data table by integrating two data tables, i.e., a purchase history table 41 and a purchaser table 42. Both the purchase history table 41 and the purchaser table 42 refer to an item of Purchaser ID, which may serve as data elements having comparability in magnitude, in association with data elements in rows. In this connection, the purchase history table 41 can be regarded as the first data table within two data tables, while the purchaser table 42 can be regarded as the second data table within two data tables. Alternatively, the purchaser table 42 can be regarded as the first data table within two data tables, while the purchase history table 41 can be regarded as the second data table within two data tables.

The purchase history table 41 is a data table having items such as Purchaser ID, Product Name as the name of each product purchased by a purchaser identified by Purchaser ID, Price of each product, and Date showing date and month of purchase in association with each other. The purchaser table 42 is a data table having items such as Purchaser ID, Name of a purchaser identified by Purchaser ID, and Age in association with each other. Referring to the item of Purchaser ID, two data tables are integrated together to generate an integrative data table 43 having items such as Purchaser ID, Product Name, Price, Date, Name, and Age in association with each other. The integrative data table 43 does not integrate a row indicating Purchaser ID; 2, Name; Hanako, Age; 45. This is because the purchase history table 41 does not include a purchase history of a person identified by Purchaser ID; 2, Name; Hanako, Age; 45. Hereinafter, a method of generating an integrative data table as described above will be described in a step-by-step manner. In this connection, it is possible for an integrative data table to integrate the information of a person identified by Purchaser ID; 2, Name; Hanako, Age; 45. In this case, the information of a person may include null-state fields not having any information about Product Name, Price, and Date.

Figure 5:
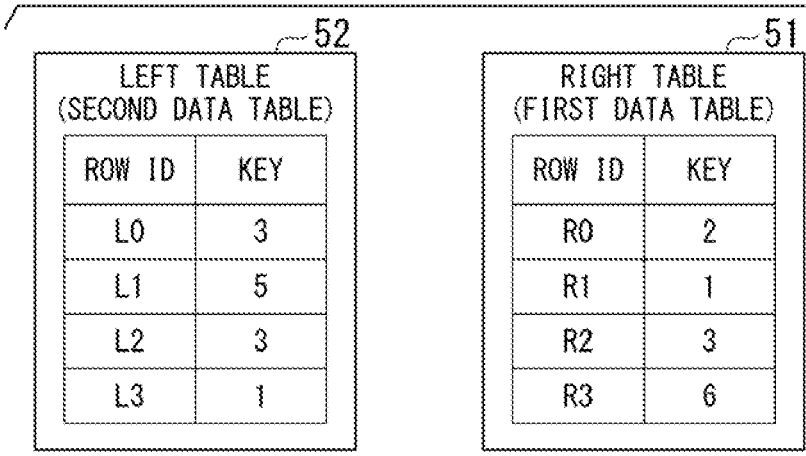
FIG. 5 is a first drawing showing an example of two data tables subjected to integration according to the exemplary embodiment.

FIG. 5 is a first drawing showing an example of two data tables subjected to integration.

FIG. 5 shows a right table 51 (a first data table) and a left table 52 (a second data table), which serve as two rows subjected to integration according to the exemplary embodiment. The right table 51 and the left table 52 have a plurality of rows each having an association between the row ID and the key. In the exemplary embodiment, two data tables such as the right table 51 and the left table 52 may each include data elements having comparability in magnitude serving as a key in respective rows.

Figure 6:
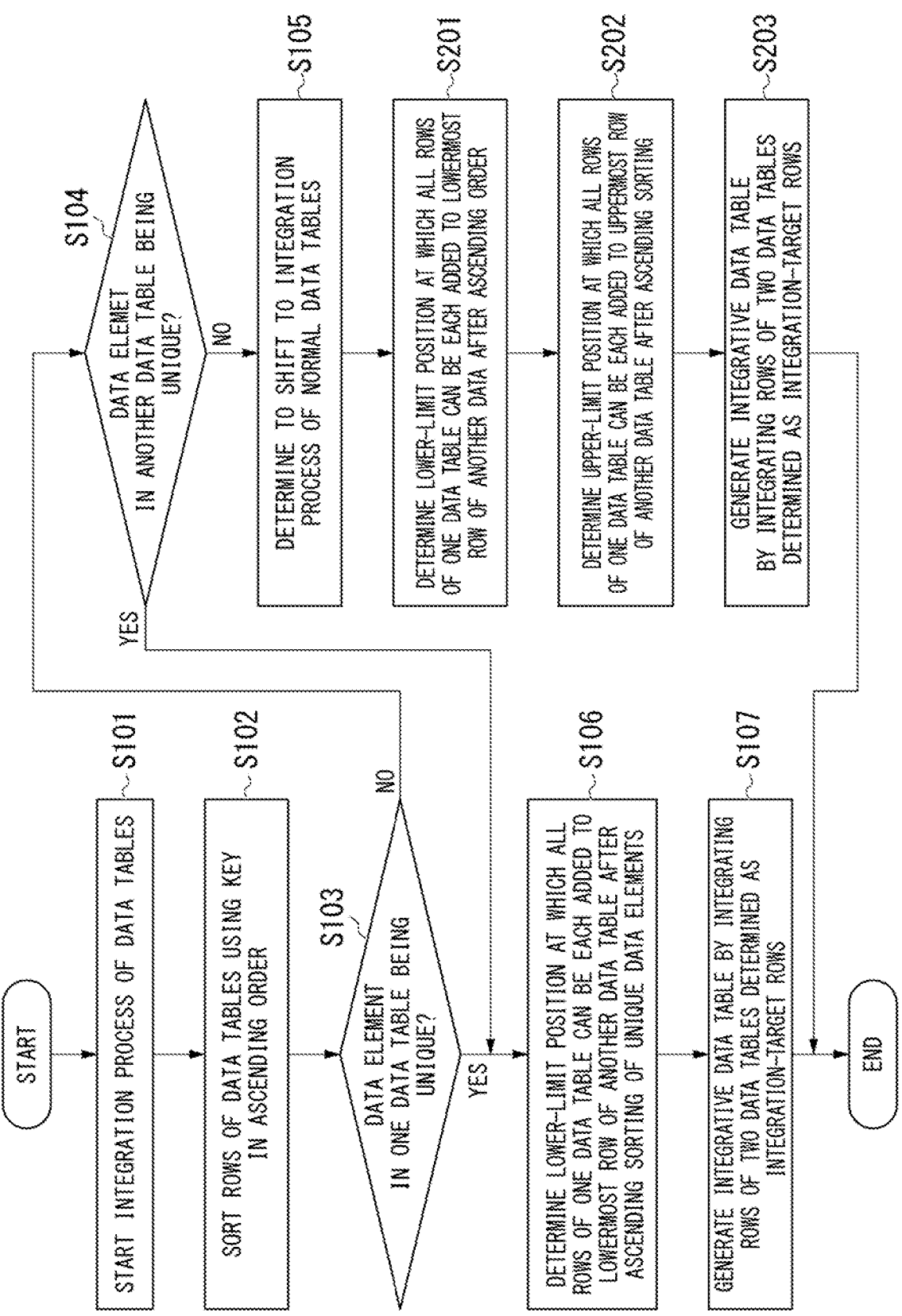
FIG. 6 is a flowchart showing a flow of processing of the integration device according to the exemplary embodiment.
Figure 7:
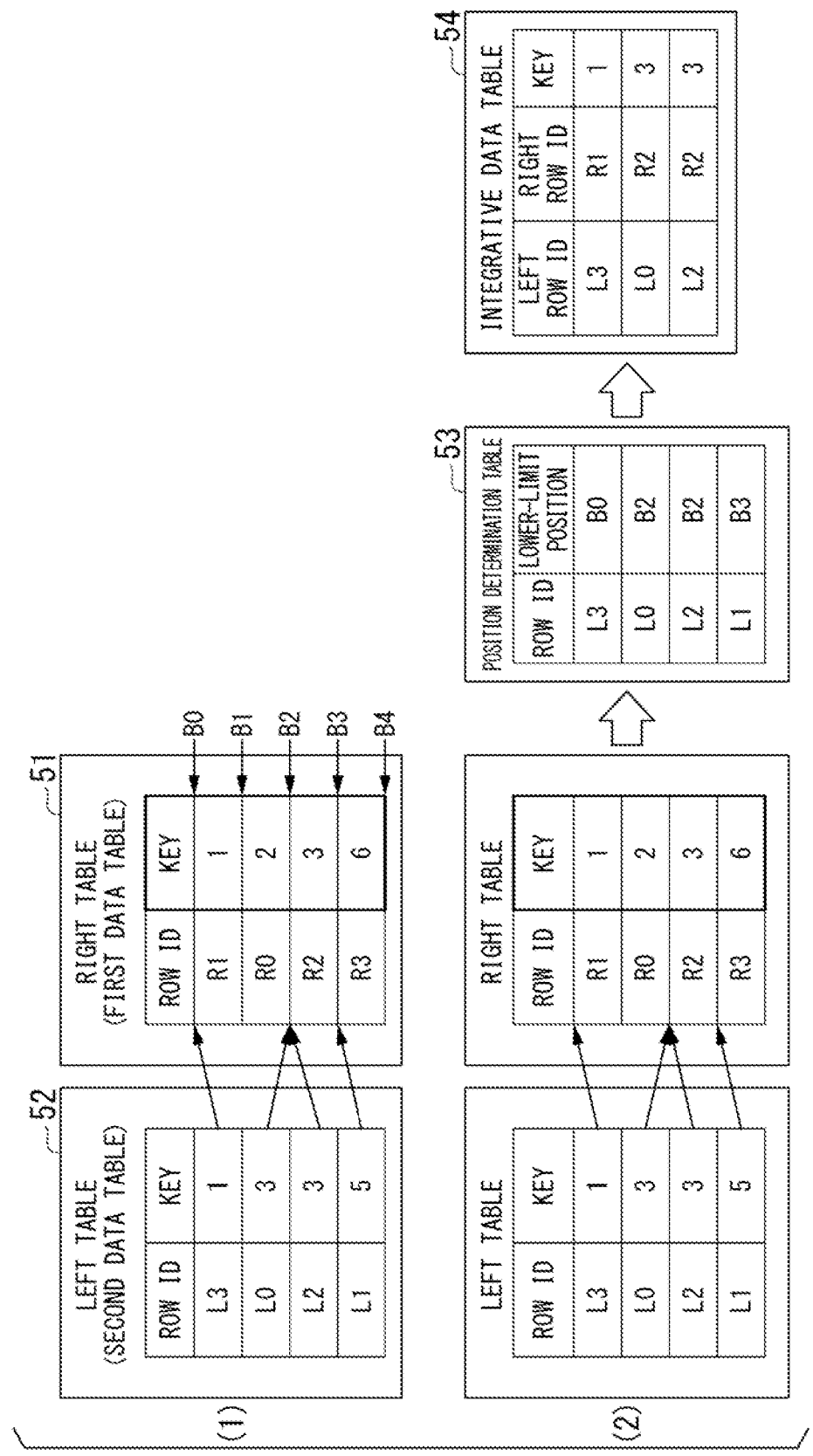
FIG. 7 is a first drawing showing the outline of processing of the integration device according to the exemplary embodiment.

FIG. 6 is a flowchart showing a flow of processing of the integration device 1. FIG. 7 is a first drawing showing the outline of processing of the integration device 1.

A user may operate the terminal 2 to access the integration device 1. Subsequently, the user may operate the terminal 2 to designate two data tables to be integrated together by the integration device 1, to designate data elements which can be compared in magnitude in data tables, and to provide an instruction to start integration. Accordingly, the integration device 1 starts the integration process of two data tables (step S101). As two data tables, it is possible to mention the right table 51 (i.e., the first data table) and the left table 52 (i.e., the second data table) shown in FIG. 5. In this connection, the two data tables include the same type of data elements having comparability in magnitude. In FIG. 6, keys serve as data elements having comparability in magnitude. Two data tables have the same type of information as the key information.

When the integration device 1 receives an instruction to start integration, the control unit 10 instructs the sorting unit 12 to ascending sorting with respect to data elements having comparability in magnitude. The sorting unit 12 sorts rows of the right table 51 and rows of the left table 52 using keys in an ascending order (step S102). As shown in FIG. 7(1), the sorting unit 12 sorts the rows of the right table 51 such that keys described in the rows of the right table 51 will be realigned in an order of "1", "2", "3", "6" from top to bottom in an ascending order. As shown in FIG. 7(1), the sorting unit 12 sorts the rows of the left table 52 such that keys described in the rows of the left table 52 will be realigned in an order of "1", "3", "3", "5" from top to bottom in an ascending order.

After completion of sorting, the control unit 10 instructs the uniqueness determination unit 13 to carry out its process. The uniqueness determination unit 13 determines whether keys serving as data elements establishing a comparison between the rows of the right table 51 in magnitude are unique (step S103). The uniqueness determination unit 13 outputs the determination result thereof to the control unit 10. Upon determining uniqueness of keys serving as data elements establishing a comparison between the rows of the right table 51 in magnitude, the control unit 10 exactly defines the right table 51 as the first data table and the left table 52 as the second data table, thus starting the integration process of data tables according to the method of reducing processing loads.

Upon failing to determine uniqueness of keys serving as data elements establishing a comparison between the rows of the right table 51 in magnitude, the uniqueness determination unit 13 subsequently proceeds to the next step of determination as to whether keys serving as data elements establishing a comparison between the rows of the left table 52 in magnitude are each unique (step S104). The uniqueness determination unit 13 outputs the determination result thereof to the control unit 10. Upon determining uniqueness of keys serving as data elements establishing a comparison between the rows of the right table 51 in magnitude, the control unit 10 reversely changes definitions between the right table 51 and the left table 52 in relation to the first data table and the second data table such that the left table 52 will be defined as the first data table while the right table 51 will be defined as the second data table, thus starting the integration process of data tables according to the method of reducing processing loads. In the following description, it is assumed that keys serving as data elements establishing a comparison between the rows of the left table 52 in magnitude are not unique. That is, the left table 52 includes two rows each having the same key "3". Therefore, upon defining the right table 51 as the first data table and the left table 52 as the second data table, an explanation will be continued with respect to the operation to start the integration process according to the method of reducing processing loads.

The uniqueness determination unit 13 outputs the determination result thereof to the control unit 10 when keys serving as data elements establishing a comparison between the rows of the right table 51 in magnitude are not unique while keys serving as data elements establishing a comparison between the rows of the left table 52 in magnitude are not unique. The control unit 10 may determine to switch to another integration process of data tables incapable of reducing processing loads when keys serving as data elements establishing a comparison between the rows of any data table in magnitude are not unique.

In the aforementioned processes, the sorting unit 12 is configured to sort keys, which may serve as data elements establishing a comparison between the rows in both the data tables such as the right table 51 and the left table 52 in magnitude, in an ascending order, whereas it is required to perform sorting with at least data tables having unique keys serving as data elements establishing a comparison between the rows of data tables.

Upon starting the integration process of data tables according to the method of reducing processing loads, the control unit 10 outputs the result of the integration process of data tables according to the method of reducing processing loads to the position determination unit 14. The position determination unit 14 sets n=1 to identify the first row of the left table 52. The first row (n=1) of the left table 52 corresponds to the row having row ID=L3. The position determination unit 14 obtains key "1" at row L3. After ascending sorting using keys serving as data elements in the rows of the right table 51 in comparison with key "1" serving as a data element of row L3 in the left table 52, the position determination unit 14 compares the rows of the right table 51 with the key in magnitude so as to determine the lower-limit position of the right table 51, at which row L3 of the left table 52 can be added to the lowermost row of the right table 51 after ascending sorting, entirely in conformity with an ascending order of sorting. In this connection, FIG. 7(1) shows boundary positions B0 through B4 each interposed between vertically adjacent rows in the right table 51. Upon comparing key "1" serving as a data element in row L3 of the left table 52 with data elements in the rows of the right table 51 after ascending sorting using keys serving as data elements in the rows of the right table 51, it is possible to determine the boundary position B0 as the lower-limit position of the right table 51, at which row L3 of the left table 52 can be added to the lowermost row of the right table 51 after ascending sorting, entirely in conformity with an ascending order of sorting. In short, the lower-limit position goes to B0.

Similarly, the position determination unit 14 sets n=2 via n=1+1, thus identifying the second row of the left table 52. The second row (n=2) of the left table 52 corresponds to row ID=L0. The position determination unit 14 obtains key "3" of row L0. Upon comparing key "3" serving as the data element of row L0 in the left table 52 with keys of rows of the right table 51 after ascending sorting using keys serving as data elements of rows of the right table 51 in magnitude, the position determination unit 14 determines the lower-limit position of the right table 51, at which row L0 of the left table 52 can be added to the lowermost row of the right table 51 after ascending sorting, entirely in conformity with an ascending order of sorting. Upon comparing key "3" serving as the data element of row L0 of the left table 52 with data elements of rows of the right table 51 after ascending order using keys serving as data elements of rows of the right table 51 in magnitude, it is possible to determine the boundary position B2 as the lower-limit position of the right table 51, at which row L0 of the left table 52 can be added to the lowermost row of the right table 51 after ascending sorting, entirely in conformity with an ascending order of sorting. In short, the lower-limit position goes to B2.

Similarly, the position determination unit 14 sets n=3 via n=n+1, thus identifying the third row of the left table 52. The third row (n=3) of the left table 52 corresponds to row ID=L2. The position determination unit 14 obtains key "3" of row L2. The position determination unit 14 compares key "3" serving as the data element of row L2 with keys of rows of the right table 51 after ascending sorting using keys serving as data elements of rows of the right table 51 in magnitude, thus determining the lower-limit position of the right table 51, at which row L2 of the left table 52 can be added to the lowermost row of the right table 51 after ascending sorting, entirely in conformity with the ascending order of sorting. Upon comparing key "3" as the data element of row L2 of the left table 52 with data elements of rows of right table 51 after ascending sorting using keys serving as data elements of rows of the right table 51 in magnitude, it is possible to determine the boundary position B2 as the lower-limit position of the right table 51, at which row L2 of the left table 52 can be added to the lowermost row of the right table 51 after ascending sorting, entirely in conformity with the ascending order of sorting. In short, the lower-limit position goes to B2.

Similarly, the position determination unit 14 sets n=4 via n=n+1, thus identifying the fourth row of the left table 52. The fourth row (n=4) of the left table 52 corresponds to row ID=L1. The position determination unit 14 obtains key "5" of row L1. The position determination unit 14 compares key "5" serving as the data element of row L1 of the left table 52 with keys of rows of the right table 51 after ascending sorting using keys serving as data elements of rows of the right table 51 in magnitude, thus identifying the lower-limit position of the right table 51, at which row L1 of the left table 52 can be added to the lowermost row of the right table 51 after ascending sorting, entirely in conformity with the ascending order of sorting. Upon comparing key "5" serving as the data element of row L1 of the left table 52 with data elements of the right table 51 after ascending sorting using keys serving as data elements of rows of the right table 51, it is possible to determine the boundary position B3 as the lower-limit position of the right table 51, at which row L1 of the left table 52 can be added to the lowermost row of the right table 51 after ascending sorting, entirely in conformity with the ascending order of sorting. In short, the lower-limit position goes to B3.

Accordingly, the position determination unit 14 determines the lower-limit position as the boundary position B0 at which row L3 of the left table 52 can be added to the lowermost row of the right table 51 after ascending sorting. The position determination unit 14 determines the lower-limit position as the boundary position B2 at which row L0 of the left table 52 can be added to the lowermost row of the right table 51 after ascending sorting. In addition, the position determination unit 14 determines the lower-limit position as the boundary position B2 at which row L2 of the left table 52 can be added to the lowermost row of the right table 51 after ascending sorting. Moreover, the position determination unit 14 determines the lower-limit position as the boundary position B3 at which row L1 of the left table 52 can be added to the lowermost row of the right table 51 after ascending sorting. In short, the position determination unit 14 may sequentially determine the lower-limit positions at which all the rows of the left table 52 can be each added to the lowermost row of the right table 51 after ascending sorting (step S106). Subsequently, the position determination unit 14 generates a position determination table 53 configured to store row IDs of the left table 52 in association with lower-limit positions identified with row IDs. Thereafter, the position determination unit 14 outputs an end of processing to the control unit 10.

The process of the position determination unit 14 to be performed when the first data table (i.e., the right table 51) has unique data elements may serve as one aspect of the process to compare data elements of rows of the second data table (i.e., the left table 52) within two data tables with data elements of rows of the first data table (i.e., the right table 51) after ascending sorting using data elements of the first data table in magnitude, thus identifying the lower-limit position of the first data table at which each row of the second data table (i.e., the left table 52) can be added to the lowermost row of the first data table (i.e., the right table 51) after ascending sorting. The aforementioned comparison in magnitude can be implemented by the binary search. Alternatively, it is possible to use other search methods for the comparison in magnitude. For example, the comparison in magnitude can be implemented by the simple search. By using the binary search for the comparison in magnitude after ascending sorting of keys serving as data elements in each data table, it is possible to reduce the amount of processing or the amount of processing loads.

Next, the control unit 10 instruct the integration unit 15 to integrate two data tables. Subsequently, the integration unit 15 sets n=1 with reference to the left table 52, the right table 51, and the position determination table 53, and therefore the integration unit 15 determines whether key "1" serving as the data element of the first row (having row ID=L3) matches key "1" serving as the data element of row R1 next to the lower-limit position of the right table 51 after ascending sorting, which is identified using key "1" of row L3 of the left table 52, in the ascending order of sorting. In this case, the integration unit 15 finds a match between the left table 52 and the right table 51 both having the same key "1". Accordingly, the integration unit 15 determines row L3 and row R1 as integration-target rows, and therefore the integration unit 15 generates an integrative data table to integrate row L3 and row R1 with a row describing row ID "L3", row ID "R1", and key "1".

Next, the integration unit 15 sets n=n+1=2 so as to determine whether key "3" serving as the data element of the second row (i.e., row ID=L0) of the left table 52 matches key "3" serving as the data element of row R2 next to the lower-limit position B2 of the right table 51 after ascending sorting, which is identified using key "3" serving as the data element of row L0 of the left table 52. In this case, the integration unit 15 finds a match between the left table 52 and the right table 51 both having the same key "3". Accordingly, the integration unit 15 determines row L0 and row R2 as integration-target rows, and therefore the integration unit 15 integrates row L0 and row R2 on the integrative data table merged with another row describing row ID "L0", row ID "R2", and key "3".

Next, the integration unit 15 sets n=n+1=3 so as to determine whether key "3" serving as the data element of the third row (having row ID=L2) of left table 52 matches key "3" serving as the data element of row R2 next to the lower-limit position B2 of the right table 51 after ascending sorting, which is identified using key "3" serving as the data element of row L2 of the left table 52, in the ascending order of sorting. In this case, the integration unit 15 finds a match between the left table 52 and the right table 51 both having the same key "3". Accordingly, the integration unit 15 determines row L2 and row R2 as integration-target rows, and therefore the integration unit 15 integrates row L2 and row R2 on the integrative data table merged with a further row describing row ID "L2", row ID "R2", and key "3".

Next, the integration unit 15 sets n=n+1=4 so as to determine whether key "5" serving as the data elements of the fourth row (i.e., row ID=L1) of the left table 52 matches key "6" serving as data element of row R3 next to the lower-limit position B3 of the right table 51 after sorting, which is identified using key "5" serving as the data element of row L1 of the left table 52, in the ascending order of sorting. In this case, the integration unit 15 does not find a match between the left table 52 having key "5" and the right table 51 having key "6". For this reason, the integration unit 15 does not determine row L1 and row R3 as integration-target rows. However, it is possible to use another integration process to merge solely the information of row L1 with the integrative data table.

Similarly, the integration unit 15 may determine integration-target rows with respect to all rows of the left table 52 so as to integrate integration-target rows of the left table 52 and the right table 51 on the integrative data table to be merged with additional rows describing row IDs of integration-target rows and their key values. As described above, it is possible to completely generate the integrative data table (step S107).

Upon determining to switch to an integration process of data tables without reducing the amount of processing loads in step S105, the control unit 10 outputs the integration process of data tables to the position determination unit 14.

FIG. 8 is a second drawing showing an example of two data tables subjected to integration.

FIG. 8 shows the right table 61 (i.e., the first data table) and the left table 62 (i.e., the second data table). Both the right table 61 and the left table 62 have a plurality of rows describing associations between row IDs and keys. As shown in FIG. 8, data elements of rows having comparability in magnitude in either the right table 61 and the left table 62 include nonunique keys. For example, the right table 61 includes two rows having the same key "1"; hence, data elements of rows having comparability in magnitude in the right table 61 include nonunique keys. In addition, the left table 62 includes two rows having the same key "3"; hence, data elements of rows having comparability in magnitude in the left table 62 include nonunique keys. When data elements of rows having comparability in magnitude in either data table include nonunique keys, it is possible to perform another integration method of data elements, which will be described below.

Figure 9:
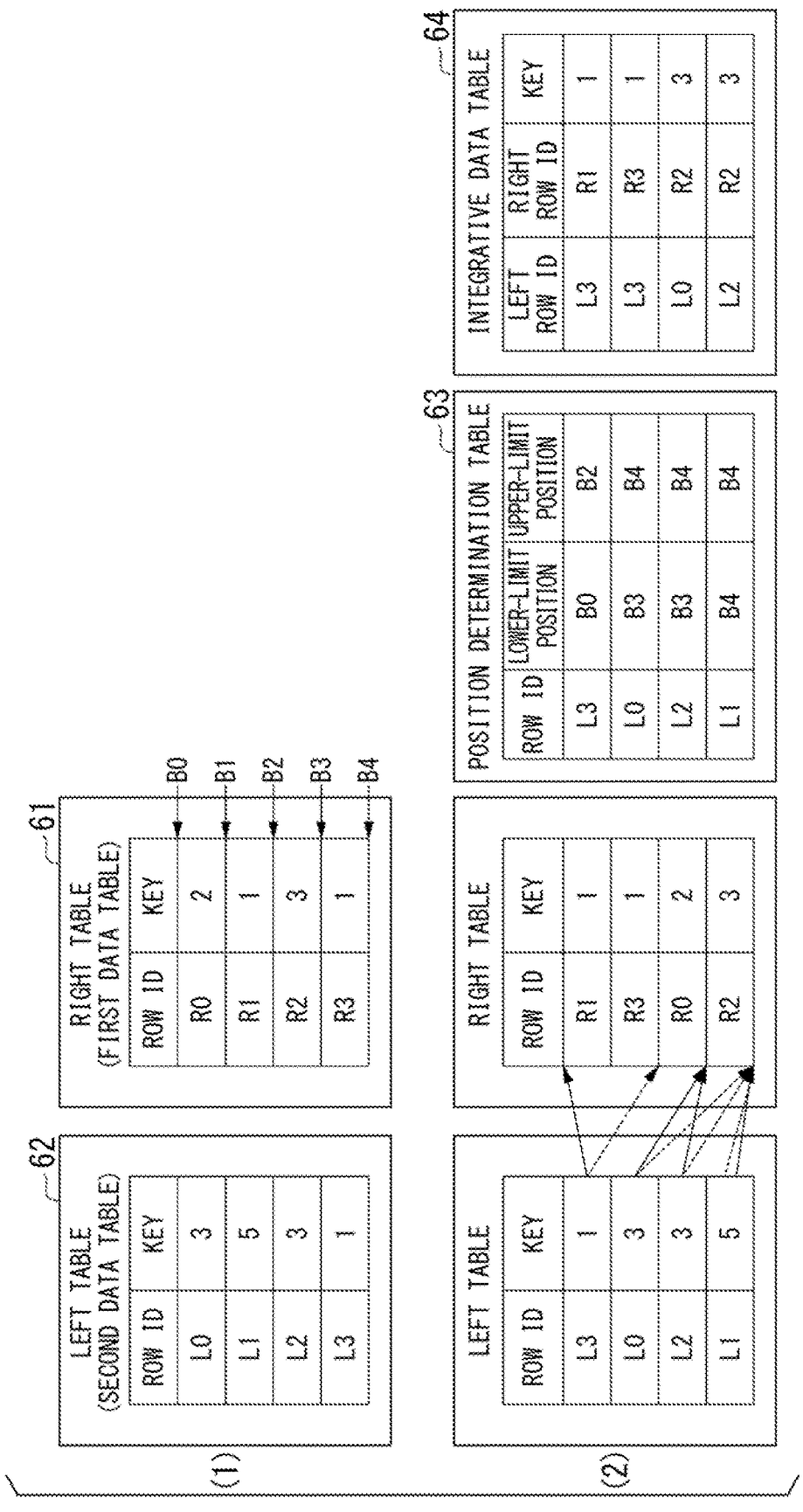
FIG. 9 is a second drawing showing the outline of processing of the integration device according to the exemplary embodiment.

FIG. 9 is a second drawing showing the outline of processing of the integration device 1.

Assuming that ascending sorting has been performed in step S102 of FIG. 6, as shown in FIG. 9(2), keys of rows of the right table 61 have been realigned in an ascending order of "1", "1", "2", "3" from top to bottom. As shown in FIG. 9(2), keys of rows of the left table 62 have been realigned in an ascending order of "1", "3", "3", "5" from top to bottom.

According to an instruction from the control unit 10, the position determination unit 14 may perform a similar process to determine the lower-limit position in the integration process of data tables according to the method to reduce processing loads. That is, the position determination unit 14 sets n=1 to identify the first row of the left table 62. The first row (n=1) of the left table 62 corresponds to row ID=L3. The position determination unit 15 obtains key "1" of row L3. The position determination unit 14 compares key "1" serving as the data element of row L3 of the left table 62 with each of rows of the right table 61 after ascending order using data elements of rows of the right table 61 in magnitude, thus determining the lower-limit position of the right table 61, at which row L3 of the left table 62 can be added to the lowermost row of the right table 61 after ascending sorting, entirely in conformity with the ascending order of sorting. As shown in FIG. 9(1), intermediate positions interposed between adjacent rows in the right table 61 will be referred to as boundary positions B0-B4. Upon comparing key "1" serving as the data element of row L3 of the left table 62 with data elements of rows of the right table 61 after ascending sorting using data elements of rows of the right table 61 in magnitude, it is possible to determine the boundary position B0 as the lower-limit position of the right table 61, at which low L3 of the left table 62 can be added to the lowermost row of the right table 61 after ascending sorting, entirely in conformity with the ascending order of sorting. In this case, the lower-limit position goes to B0.

Similarly, the position determination unit 14 sets n=2 via n=n+1 so as to identify the second row of the left table 62. The second row (n=2) of the left table 62 corresponds to row ID=L0. The position determination unit 14 obtains key "3" of row L0. The position determination unit 14 compares key "3" serving as the data element of row L0 of the left table 62 with keys serving as data elements of rows of the right table 61 after ascending sorting using keys of data elements of rows of the right table 61 in magnitude, thus determining the lower-limit position of the right table 61, at which low L0 of the left table 62 can be added to the lowermost row of the right table 61 after ascending sorting, entirely in conformity with the ascending order of sorting. Upon comparing key "3" serving as the data element of row L0 of the left table 62 with data elements of rows of the right table 61 after ascending sorting using keys serving as data elements of rows of the right table 61 in magnitude, it is possible to determine the boundary position B3 as the lower-limit position of the right table 61, at which row L0 of the left table 62 can be added to the lowermost row of the right table 61 after ascending sorting, entirely in conformity with the ascending order of sorting. In this case, the lower-limit position goes to B3.

Similarly, the position determination unit 14 sets n=3 via n=n+1 so as to identify the third row of the left table 62. The third row (n=3) of the left table 62 corresponds to row ID=L2. The position determination unit 14 obtains key "3" of row L2 of the left table 62. The position determination unit 14 compares key "3" serving as the data element of row L2 of the left table 62 with keys serving as data elements of the right table 61 after ascending sorting using keys of data elements of rows of the right table 61 in magnitude, thus determining the lower-limit position of the right table 61, at which row L2 of the left table 62 can be added to the lowermost row of the right table 61 after ascending sorting, entirely in conformity with the ascending order of sorting.

Upon comparing key "3" serving as the data element of row L2 of the left table 62 with data elements of rows of the right table 61 after ascending sorting using keys of data elements of rows of the right table 61 in magnitude, it is possible to determine the boundary position B3 as the lower-limit position of the right table 61, at which row L2 of the left table 62 can be added to the lowermost row of the right table 61 after ascending order, entirely in conformity with the ascending order of sorting. In this case, the lower-limit position goes to B3.

Similarly, the position determination unit 14 sets n=4 via n=n+1, thus identifying the fourth row of the left table 62. The fourth row (n=4) of the left table 62 corresponds to row ID=L1. The position determination unit 14 obtains key "5" of row L1. The position determination unit 14 compares key "5" serving as the data element of row L1 of the left table 62 with keys of rows of the right table 61 after ascending sorting using keys serving as data elements of rows of the right table 61 in magnitude, thus determining the lower-limit position of the right table 61, at which row L1 of the left table 62 can be added to the lowermost row of the right table 61 after ascending sorting, entirely in conformity with the ascending order of sorting. Upon comparing key "5" serving as the data element of row L1 of the left table 62 with data elements of rows of the right table 61 after ascending sorting using keys serving as data elements of rows of the right table 61 in magnitude, it is possible to determine the boundary position B4 as the lower-limit position of the right table 61, at which row L1 of the left table 62 can be added to the lowermost row of the right table 61 after ascending sorting, entirely in conformity with the ascending order of sorting. In this case, the lower-limit position goes to B4.

As described above, the position determination unit 14 determines the boundary position B0 as the lower-limit position of the right table 61 at which row L3 of the left table 62 can be added to the lowermost row of the right table 61 after ascending sorting. The position determination unit 14 determines the boundary position B3 as the lower-limit position of the right table 61 at which row L0 of the left table 62 can be added to the lowermost row of the right table 61 after ascending sorting. In addition, the position determination unit 14 determines the boundary position B3 as the lower-limit position of the right table 61 at which row L2 of the left table 62 can be added to the lowermost row of the right table 61 after ascending sorting. Moreover, the position determination unit 14 determines the boundary position B4 as the lower-limit position of the right table 61 at which row L1 of the left table 62 can be added to the lowermost row of the right table 61 after ascending sorting. In short, the position determination unit 14 determines the lower-limit positions at which all rows of the left table 62 can be each added to the lowermost row of the right table 61 after ascending sorting (step S201).

When data elements of rows of the first data table (i.e., the right table 61) include nonunique keys, the process of step S201 implemented by the position determination unit 14 is one aspect of the process to compare data elements of rows of the second data table (i.e., the left table 62) within two data tables with data elements of rows of the first data table (i.e., the right table 61) after ascending sorting using data elements of rows of the first data table in magnitude, thus determining the lower-limit position of the first data table, at which each row of the second data table (i.e., the left table 62) can be added to the lowermost row of the first data table (i.e., the right table 61) after ascending sorting, entirely in conformity with the ascending order of sorting. The aforementioned comparison in magnitude is performed using the binary search.

Alternatively, it is possible to use another search method for comparison in magnitude. For example, it is possible to make comparison in magnitude by the simple search. Due to comparison in magnitude after ascending sorting of keys serving as data elements, it is possible to reduce the amount of processing or the amount of processing loads by way of the binary search.

Next, the position determination unit 14 may determine the upper-limit position which has not be performed in the integration process of data tables according to the method of reducing processing loads. That is, the position determination unit 14 sets n=1 to identify the first row of the left table 52. The first row (n=1) of the left table 52 corresponds to row ID=L3. The position determination unit 14 obtains key "1" of row L3 of the left table 52. The position determination unit 14 compares key "1" serving as the data element of row L3 of the left table 52 with keys of rows of the right table 51 after ascending sorting using keys of data elements of the right table 51 in magnitude, thus determining the upper-limit position of the right table 51, at which row L3 of the left table 52 can be added to the uppermost row of the right table 51 after ascending sorting. Upon comparing key "1" serving as the data element of row L3 of the left table 62 with data elements of rows of the right table 61 after ascending sorting using keys serving as data elements of rows of the right table 61, it is possible to determine the boundary position B2 as the upper-limit position of the right table 61, at which row L3 of the left table 62 can be added to the uppermost row of the right table 61 after ascending sorting, entirely in conformity with the ascending order of sorting. In this case, the upper-limit position goes to B2.

Similarly, the position determination unit 14 sets n=2 via n=n+1 to identify the second row of the left table 62. The second row (n=2) of the left table 62 corresponds to row ID=L0. The position determination unit 14 obtains key "3" of row L0 of the left table 62. The position determination unit 14 compares key "3" serving as the data element of row L0 of the left table 62 with keys of rows of the right table 61 after ascending sorting using keys serving as data elements of rows of the right table 61 in magnitude, thus determining the upper-limit position of the right table 61, at which row L0 of the left table 62 can be added to the uppermost row of the right table 61 after ascending sorting, entirely in conformity with the ascending order of sorting. Upon comparing key "3" serving as the data element of row L0 of the left table 62 with data elements of rows of the right table 61 after ascending sorting using keys serving as data elements of the right table 61 in magnitude, it is possible to determine the boundary position B4 as the uppermost row, at which row L0 of the left table 62 can be added to the uppermost row of the right table 61 after ascending sorting, entirely in conformity with the ascending order of sorting. In this case, the upper-limit position goes to B4.

Similarly, the position determination unit 14 sets n=3 via n=n+1 to identify the third row of the left table 62. The third row (n=3) of the left table 62 corresponds to row ID=L2. The position determination unit 14 obtains key "3" of row L2 of the left table 62. The position determination unit 14 compares key "3" serving as the data element of row L2 of the left table 62 with keys of rows of the right table 61 after ascending sorting using keys serving as data elements of rows of the right table 61 in magnitude, thus determining the upper-limit position of the right table 61, at which row L2 of the left table 62 can be added to the uppermost row of the right table 61 after ascending sorting, entirely in conformity with the ascending order of sorting. Upon comparing key "3" serving as the data element of row L2 of the left table 62 with data elements of rows of the right table 61 after ascending sorting using keys serving as data elements of rows of the right table 61 in magnitude, it is possible to determine the boundary position B4 as the upper-limit position of the right table 61, at which row L2 of the left table 62 can be added to the uppermost row of the right table 61 after ascending sorting, entirely in conformity with the ascending order of sorting. In this case, the upper-limit position goes to B4.

Similarly, the position determination unit 14 sets n=4 via n=n+1 to identify the fourth row of the left table 62. The fourth row (n=4) of the left table 62 corresponds to row ID=L1. The position determination unit 14 obtains key "5" of row L1 of the left table 62. The position determination unit 14 compares key "5" serving as the data element of row L1 of the left table 62 with keys of rows of the right table 61 after ascending sorting using keys serving as data elements of rows of the right table 61 in magnitude, thus determining the upper-limit position of the right table 61, at which row L1 of the left table 62 can be added to the uppermost row of the right table 61 after ascending sorting, entirely in conformity with the ascending order of sorting. Upon comparing key "5" serving as the data element of row L1 of the left table 62 with data elements of rows of the right table 61 using keys serving as data elements of rows of the right table 61 in magnitude, it is possible to determine the boundary position B4 as the upper-limit position of the right table 61, at which row L1 of the left table 62 can be added to the uppermost row of the right table 61 after ascending sorting, entirely in conformity with the ascending order of sorting. In this case, the upper-limit position goes to B4.

As described above, the position determination unit 14 determines the boundary position B2 as the upper-limit position of the right table 61 at which row L3 of the left table 62 can be added to the uppermost row of the right table 61 after ascending sorting. The position determination unit 14 determines the boundary position B4 as the upper-limit position of the right table 61 at which row L0 of the left table 62 can be added to the uppermost row of the right table 61 after ascending sorting. In addition, the position determination unit 14 determines the boundary position B4 as the upper-limit position of the right table 61 at which row L2 of the left table 62 can be added to the uppermost row of the right table 61 after ascending sorting. Moreover, the position determination unit 14 determines the boundary position B4 as the upper-limit position of the right table 61 at which row L1 of the left table 62 can be added to the uppermost row of the right table 61 after ascending sorting. That is, the position determination unit 14 determines the upper-limit position of the right table 61 at which all rows of left table 62 can be each added to the uppermost row of the right table 61 after ascending sorting (step S202).

Subsequently, the position determination unit 14 generates the position determination table 63 configured to store associations between the row ID of the left table 62, the lower-limit position and the upper-limit position to be determined according to the row ID. Thereafter, the position determination unit 14 outputs an end of processing to the control unit 10.

When the first data table (i.e., the right table 61) includes nonunique data elements, the process of the position determination unit 14 is one aspect of the process to compare data elements of rows of the second data table (i.e., the left table 62) within two data tables with data elements of rows of the first data table (i.e., the right table 61) after ascending sorting using data elements of rows of the first data table in magnitude, thus determining the upper-limit position of the first data table, at which rows of the second data table (i.e., the left table 62) can be each added to the uppermost row of the first data table (i.e., the right table 61) after ascending sorting, entirely in conformity with the ascending order of sorting. The aforementioned determination of the upper-limit position includes comparison in magnitude using the binary search. Alternatively, the comparison in magnitude included in the determination of the upper-limit position may use another search method. In the determination of the upper-limit position, for example, the comparison in magnitude may use the simple search. Due to the comparison magnitude after ascending sorting for sorting keys serving as data elements, it is possible to reduce the amount of processing or the amount of processing loads by way of the binary search.

Next, the control unit 10 instructs the integration unit 15 to integrate two data tables. Subsequently, the integration unit 15 sets n=1 with reference to the left table 62, the right table 61, and the position determination table 63, thus determining whether key "1" serving as the data element of the first row of the left table 62 (row ID=L3) matches key "1" serving as the data element of next row R1 to the lower-limit position B0 of the right table 61 after ascending sorting which is identified using key "1" serving as the data element of row L3 of the left table 62. In this case, the integration unit 15 finds a match between row L3 of the left table 62 and row R1 the right table 61 both having the same key "1". Accordingly, the integration unit 15 determines row L3 and row R1 as integration-target rows so as to generate an integrative data table integrating row L3 and R1 with a row describing row ID "L3", row ID "R1", and key "1".

The integration unit 15 may continue a match determination using the n=1 row since the integration unit 15 does not perform a match determination with respect to the data element of next row R0 to the upper-limit position B2 of the right table 61, which is identified with respect to the n=1 row (row ID=L3) of the left table 62. The integration unit 15 determines whether key "1" serving as the data element of n=1 row (row ID=L13) of the left table 62 matches key "1" of next row R3 to the boundary position B1, which is next to the lower-limit position B0 in the ascending sorting, in the right table 51 after ascending sorting which is identified using key "1" serving as the data element of row L3 of the left table 62. In this case, the integration unit 15 finds a match between row L3 of the left table 62 and row R3 of the right table 61 both having the same key "1". Accordingly, the integration unit 15 determines row L3 and row R3 as integration-target rows so as to integrate row L3 and row R3 with the integrative data table to be merged with a row describing row ID "L3", row ID "R3", and key "1".

The integration unit 15 may continue a match determination using row n=1 of the left table 62 since the integration unit 15 does not perform a match determination with respect to the data element of the next row to the upper-limit position B2 of the right table 61 which is identified with respect to row n=1 (row ID=L3) of the left table 62. The integration unit 15 determines whether key "1" serving as the data element of n=row (row ID=L3) of the left table 62 matches key "2" serving as the data element of next row R0 to the boundary position B2, which is next to the boundary position B1 in ascending sorting, in the right table 51 after ascending sorting which is identified using key "1" serving as the data element of row L3 of the left table 62. In this case, the integration unit 15 does not find a match between keys "1" and "2". Therefore, the integration unit 15 should not determine row L3 and row R0 as integration-target rows. Thereafter, the integration unit 15 exits the process regarding row n=1 of the left table 62 since the boundary position B2 is an upper-limit position which is identified with respect to row n=1 of the left table 62 and which might have indicated completion of a match determination with respect to the data element of the next row to the upper-limit position B2 of the right table 61 to be identified with row n=1 (row ID=L3) of the left table 62.

Next, the integration unit 15 sets n=n+1=2 with reference to the left table 62, the right table 61, and the position determination table 63, and therefore the integration unit 15 determines whether key "3" serving as the data element of row n=2 (row ID=L0) of the left table 62 matches key "3" serving as the data element of next row R2 to the lower-limit position B3 of the right table 61 after ascending sorting which is identified using key "3" serving as the data element of row L0 of the left table 62. In this case, the integration unit 15 finds a match between row L0 of the left table 62 and row R2 of the right table 61 both having the same key "3". Accordingly, the integration unit 15 determines row L0 and row R2 as integration-target rows, and therefore the integration unit 15 integrates row L0 and row R2 with the integrative data table to be merged with a row describing row ID "L0", row ID "R2", and key "3".

The integration unit 15 may continue a match determination with respect to row n=2 of the left table 62 since the integration unit 15 does not perform a match determination with respect to the data element of the next row to the upper-limit position B4 of the right table 61 which is identified with row n=2 (row ID=L0) of the left table 62. The integration unit 15 determines whether key "3" serving as the data element of row n=2 (row ID=L0) of the left table 62 matches the key of the data element of the next row to the boundary position B4, which is next to the boundary position B3 of the right table 61 after ascending sorting and identified with key "3" serving as the data element of row L0 of the left table 62, in the right table 61. In this case, the integration unit 15 exits the process since the right table 61 does not have the next row to the boundary position B4 in ascending sorting while the boundary position B4 is an upper-limit position to be identified with row n=2 (row ID=L0) of the left table 62.

Next, the integration unit 15 sets n=n+1=3 with reference to the left table 62, the right table 61, and the position determination table 63 so as to determine whether key "3" serving as the data element of row n=3 (row ID=L2) of the left table 62 matches key "3" serving as the data element of next row R2 to the lower-limit position B3 of the right table 61 after ascending sorting which is identified using key "3" as the data element of row L2 of the left table 62. In this case, the integration unit 15 finds a match between row L2 of the left table 62 and row R2 of the right table 61 both having the same key "3". Accordingly, the integration unit 15 determines row L2 and row R2 as integration-target rows, and therefore the integration unit 15 integrates row L2 and row R2 with the integrative data table to be merged with a row describing row ID "L2", row ID "R2", and key "3".

The integration unit 15 may continue a match determination with row n=3 of the left table 62 since the integration unit 15 does not perform a match determination with respect to the data element of the next row to the upper-limit position B4 of the right table 61 which is identified with row n=3 (row ID=L2) of the left table 62. The integration unit 15 determines whether key "3" serving as the data element of row n=3 (row ID=L2) of the left table 62 matches the key serving as the data element of the next row to the boundary position B4, which is next to the boundary position B3 of the right table 61 identified with key "3" as the data element of row L2 of the left table 62, in the right table 61. In this case, the integration unit 15 exits the process since the right table 61 does not have the next row to the boundary position B4 in the ascending order of sorting while the boundary position B4 is an upper-limit position identified with respect to row n=3 (row ID=L2) of the left table 62.

Next, the integration unit 15 sets n=n+1=4 with reference to the left table 62, the right table 61, and the position determination table 63 so as to determine whether key "5" serving as the data element of row n=4 (row ID=L1) of the left table 62 matches the key serving as the data element of next row R2 to the boundary position B4 of the right table 61 after ascending sorting which is identified with key "5" serving as the data element of row L1 of the left table 62. In this case, the integration unit 15 exits the process since the right table 61 does not have the next row to the boundary position B4 while the boundary position B4 is an upper-limit position identified with row n=4 (row ID=L2) of the left table 62.

The integration unit 15 may determine whether all rows of the left table 62 can be identified as integration-target rows so as to integrate the rows of the left table 62 identified as integration-target rows and their corresponding rows of the right table 61 on the integrative data table to be merged with rows describing the rows of the left table 62 in association with the rows of the right table 61. Thus, the integration unit 15 completely generate the integrative data table (step S203).

According to the aforementioned processes, it is necessary to solely determine the lower-limit position of the second data table within two data tables when all data elements of the first data table are unique, but it is required to determine both the lower-limit position and the upper-limit position when the first data table includes nonunique data elements. In other words, the exemplary embodiment requires solely determining the lower-limit position in generating the integrative data table when all data elements of the first data table within two data tables are unique, thus reducing the amount of processing or the amount of processing loads.

Figure 10:
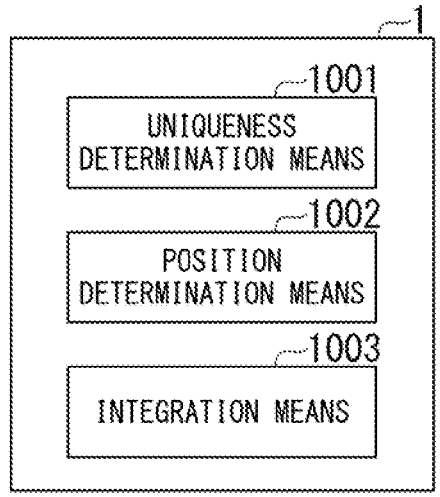
FIG. 10 is a block diagram showing the minimum configuration of the integration device according to the exemplary embodiment.

FIG. 10 is a block diagram of an integration device having the minimum configuration.

Figure 11:
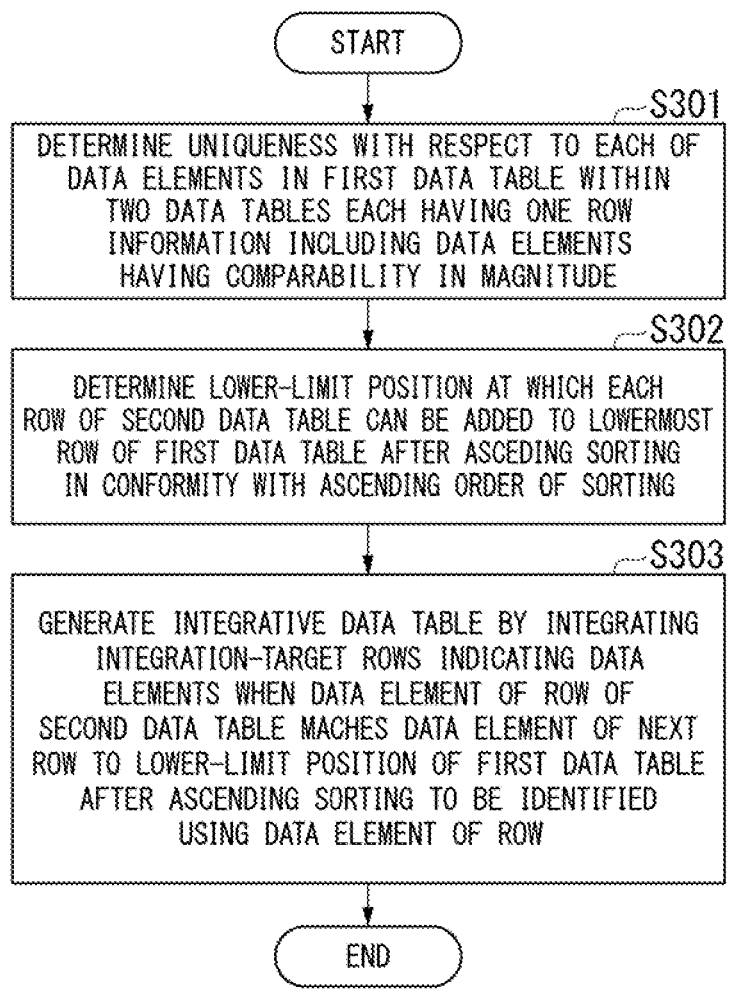
FIG. 11 is a flowchart showing a flow of processing of the integration device having the minimum configuration according to the exemplary embodiment.

FIG. 11 is a flowchart showing the flow of processing of the integration device having the minimum configuration.

As shown in FIG. 10, the integration device 1 includes at least a uniqueness determination means 1001, a position determination means 1002, and an integration means 1003.

The uniqueness determination means 1001 determines uniqueness with respect to data elements of the first data table within two data tables including at least one row of information as data elements having comparability in magnitude (step S301).

When all data elements of the first data table are unique, the position determination means 1002 compares data elements of rows of the second data table with data elements of rows of the first data table after ascending sorting using data elements of rows of the first data table, thus determining the lower-limit position of the first data table, at which rows of the second data table can be each added to the lowermost row of the first data table after ascending sorting, entirely in conformity with the ascending order of sorting (step S302).

When the data element of the row of the second data table matches the data element of the next row to the lower-limit position of the first data table after ascending sorting which is identified with the data element of the row, the integration means 1003 determines integration-target rows indicating the data elements so as to generate an integrative data table integrating integration-target rows identified in at least the first data table and the second data table (step S303).

The aforementioned integration device 1 includes a computer system therein. The aforementioned processes are stored on computer-readable storage media in the form of programs, wherein a computer may read and execute programs to achieve the aforementioned processes. Herein, computer-readable storage media refer to magnetic disks, magneto-optical disks, CD-ROM, DVD-ROM, semiconductor memory, and the like. In addition, it is possible to deliver computer programs to computers through communication lines, thus computers receiving computer programs delivered thereto may execute programs.

The foregoing programs may realize some of the foregoing functions. In addition, the foregoing programs may be differential files (or differential programs), which can achieve the foregoing functions when combined with programs pre-stored on computer systems.

REFERENCE SIGNS LIST

1 . . . integration device
2 . . . terminal
11 . . . control unit
12 . . . sorting unit
13 . . . uniqueness determination unit
14 . . . position determination unit
15 . . . integration unit
100 . . . information processing system

What is claimed is:

1. An integration device comprising:
   at least one memory configured to store instructions; and
   at least one processor configured to execute the instructions to:
   determine uniqueness with respect to each data element of a first data table after ascending sorting for sorting rows of the first data table by comparing data elements of the first data table;
   based on all data elements of the first data table having uniqueness:
      compare data elements of rows of a second data table with the data elements of the rows of the first data table after the ascending sorting; and
      determine a lower-limit position, at which each row of the second data table is to be added to a lowermost row of the first data table after the ascending sorting, entirely in conformity with an ascending order of sorting; and
   based on the first data table including a nonunique data element, determine the lower-limit position and an upper-limit position;
   when a data element of a row of the second data table matches a data element of a next row to the lower-limit position of the first data table after the ascending sorting, determine integration-target rows indicating the data elements in the second data table and the first data table based on the lower-limit position when all data elements of the first data table are unique, and based on the lower-limit position and the upper limit position when not all data elements of the first data table are unique; and
   generate an integrative data table for integrating the integration-target rows with the second data table and the first data table,
   wherein the first data table and the second data table include the data elements having comparability based on values of the data elements in at least one row.

2. The integration device according to claim 1, wherein the at least one processor is further configured to execute the instructions to, upon determining existence of the nonunique data element within the data elements of the first data table serving as one data table within the two data tables, newly define another data table within the two data tables as the first data table so as to determine the uniqueness of the data elements of the first data table.

3. The integration device according to claim 2, wherein the at least one processor is further configured to execute the instructions to, when the data element of the second data table does not match the data element of the next row to the lower-limit position of the first data table after the ascending sorting, merge the row of the second data table on the integrative data table without integrating the next row to the lower-limit position of the first data table.

4. The integration device according to claim 1, wherein the at least one processor is further configured to execute the instructions to use a binary search to compare the data elements of the rows of the second data table with the data elements of the rows of the first data table after the ascending sorting.

5. A data table integration method for integrating two data tables, the method comprising:
   determining uniqueness with respect to each data element of a first data table after ascending sorting for sorting rows of the first data table by comparing the data elements of the first data table;
   based on all data elements of the first data table having uniqueness:
      comparing data elements of rows of a second data table with the data elements of the rows of the first data table after the ascending sorting; and
      determining a lower-limit position, at which each row of the second data table is to be added to a lowermost row of the first data table after the ascending sorting, entirely in conformity with an ascending order of sorting; and
   based on the first data table including a nonunique data element, determining the lower-limit position and an upper-limit position;
   determining an integration-target row, at which a data element of a row of the second data table matches a data element of a row of the first data table having the lower-limit position after the ascending sorting, in either the second data table or the first data table based on the lower-limit position when all data elements of the first data table are unique, and based on the lower-limit position and the upper limit position when not all data elements of the first data table are unique; and
   generating an integrative data table for integrating the first data table and the second data table by way of the integration-target row,
   wherein the first data table and the second data table include the data elements having comparability based on values of the data elements in at least one row.

6. A non-transitory computer readable storage medium storing a program causing a computer of an integration device to implement:
   determining uniqueness with respect to each data element of a first data table after ascending sorting for sorting rows of the first data table by comparing the data elements of the first data table;

based on all data elements of the first data table having uniqueness:
   comparing data elements of rows of a second data table with the data elements of the rows of the first data table after the ascending sorting; and
   determining a lower-limit position, at which each row of the second data table is to be added to a lowermost row of the first data table after the ascending sorting, entirely in conformity with an ascending order of sorting; and
based on the first data table including a nonunique data element, determining the lower-limit position and an upper-limit position;
determining an integration-target row, at which a data element of a row of the second data table matches a data element of a row of the first data table having the lower-limit position after the ascending sorting, in either the second data table or the first data table based on the lower-limit position when all data elements of the first data table are unique, and based on the lower-limit position and the upper limit position when not all data elements of the first data table are unique; and
generating an integrative data table for integrating the first data table and the second data table by way of the integration-target row,
wherein the first data table and the second data table include the data elements having comparability based on values of the data elements in at least one row.

* * * * *